(12) United States Patent
Stanek et al.

(10) Patent No.: US 11,581,724 B2
(45) Date of Patent: Feb. 14, 2023

(54) CONTROLLED SWITCHING OF A CIRCUIT BREAKER

(71) Applicant: HITACHI ENERGY SWITZERLAND AG, Baden (CH)

(72) Inventors: Michael Stanek, Gebenstorf (CH); Urmil Parikh, Gujarat (IN)

(73) Assignee: HITACHI ENERGY SWITZERLAND AG, Baden (CH)

( * ) Notice: Subject to any disclaimer, the term of this patent is extended or adjusted under 35 U.S.C. 154(b) by 219 days.

(21) Appl. No.: 16/876,262

(22) Filed: May 18, 2020

(65) Prior Publication Data
US 2020/0366081 A1    Nov. 19, 2020

(30) Foreign Application Priority Data
May 16, 2019    (EP) ..................................... 19174889

(51) Int. Cl.
*H02H 3/02* (2006.01)
*H01H 33/59* (2006.01)
(Continued)

(52) U.S. Cl.
CPC .......... *H02H 3/021* (2013.01); *H01H 33/593* (2013.01); *H02H 1/0007* (2013.01); *H01H 33/006* (2013.01)

(58) Field of Classification Search
CPC ........ H01H 7/16; H01H 1/0015; H01H 1/066; H01H 9/56; H01H 33/593; H01H 33/44;
(Continued)

(56) References Cited

U.S. PATENT DOCUMENTS

| 5,119,260 A | 6/1992 | Huhse et al. |
| 6,172,863 B1 | 1/2001 | Ito et al. |

(Continued)

FOREIGN PATENT DOCUMENTS

| EP | 0384552 A2 | 6/1992 |
| EP | 1098333 A2 | 5/2001 |

(Continued)

OTHER PUBLICATIONS

European Patent Office, Extended Search Report issued in corresponding Application No. 19174889.6, dated Nov. 26, 2019, 11 pp.

(Continued)

*Primary Examiner* — Bryan R Perez
(74) *Attorney, Agent, or Firm* — Sage Patent Group (57) ABSTRACT

A method for controlled switching of a circuit breaker is described. The method includes initiating operation of the circuit breaker at an initiation time derivable from an initiation time function by calculating a value of the initiation time function with respect to a command instant. The initiation time function is a sum of the command instant and a command delay time. The initiation time function depends on a first parameter and a second parameter. At least one of: the partial derivative of the initiation time function with respect to the first parameter is dependent on the second parameter or the partial derivative of the initiation time function with respect to the second parameter is dependent on the first parameter. Further, a system for controlled switching according to the method and a circuit breaker including the system are described.

20 Claims, 3 Drawing Sheets

(51) Int. Cl.
*H02H 1/00* (2006.01)
*H01H 33/00* (2006.01)

(58) Field of Classification Search
CPC .... H01H 33/563; H02H 3/0935; H02H 3/006; H02H 3/07; H02H 3/021; H02H 3/093
See application file for complete search history.

(56) References Cited

U.S. PATENT DOCUMENTS

| | | | |
|---|---|---|---|
| 6,646,361 B2 | 11/2003 | Martin | |
| 8,018,097 B2* | 9/2011 | Saito | H02J 13/0004 307/112 |
| 8,212,423 B2* | 7/2012 | Saito | H01H 9/56 307/127 |
| 2010/0254060 A1* | 10/2010 | Saito | H01H 9/56 361/115 |
| 2014/0002944 A1* | 1/2014 | Menezes | H01H 47/22 361/160 |
| 2016/0301199 A1 | 10/2016 | Mori et al. | |

FOREIGN PATENT DOCUMENTS

| | | |
|---|---|---|
| EP | 1168398 A1 | 1/2002 |
| EP | 2237296 A2 | 10/2010 |
| IN | 201001018 | 8/2012 |
| WO | 2012152793 A1 | 11/2012 |

OTHER PUBLICATIONS

CIGR? Working Group: "Controlled Switching of HVAC Circuit Breakers Guide for Application Lines, Reactors, Capacitors, Transformers (1st Part)," Electra, No. 183, Apr. 1999, 31 pp.
European Office Action dated Sep. 20, 2022 for European Patent Application No. 19174889.6, 6 pages.
Tsutada, H. et al., "Development of Synchronous Switching Controller for Gas Circuit Breakers", IEEE/PES Transmission and Distribution Conference and Exhibition 2002: Asia Pacific, Yokohama, Japan, Oct. 6-10, 2002, IEEE, vol. 2, pp. 807-812.

\* cited by examiner

CONTROLLED SWITCHING OF A CIRCUIT BREAKER

FIELD OF THE DISCLOSURE

The present disclosure relates to a method for optimizing controlled switching of a circuit breaker.

TECHNICAL BACKGROUND

Controlled switching of a circuit breaker can be understood to be a technique of controlling operation of a circuit breaker such that current start or contact separation occur at a time when an electrical reference signal has an advantageous phase angle. The electrical reference signal may for example be a current through the circuit breaker or a reference voltage.

For controlled switching, an accurate prediction of operating times of the circuit breaker is necessary. Operating times of a circuit breaker may exhibit statistical fluctuations; furthermore, they may vary depending on parameters such as temperature, control voltage, idle time, or energy stored in the drive. The number of considered parameters is typically limited. Usually, an individual compensation value is calculated for each of the parameters that may influence operating times, separately for circuit breaker closing and opening, according to a pre-defined compensation function for the respective parameter.

Further, prediction of the operating times usually includes a consideration of all individual compensation values for that circuit breaker operation, as described in FRÖHLICH et al. Controlled Switching of HVAC Circuit Breakers. Électra. April 1999, No. 183, pages 43 to 73. The accuracy of the predicted operating times may be limited, which will result in non-ideal controlled switching performance.

It is therefore an object of the present disclosure to overcome at least some of the above-mentioned problems in the prior art at least partially.

SUMMARY OF THE DISCLOSURE

In view of the above, a method for controlled switching of a circuit breaker is provided. The method includes initiating operation of the circuit breaker at an initiation instant derivable from an initiation time function. The initiation time function depends on a first parameter and a second parameter. The partial derivative of the initiation time function with respect to the first parameter depends on the second parameter and/or the partial derivative of the initiation time function with respect to the second parameter depends on the first parameter.

Furthermore, a system for controlled switching of a circuit breaker is provided. The system is configured for performing the method for controlled switching according to aspects described herein, particularly the method according to any of claims 1 to 10.

Additionally, a circuit breaker is provided. The circuit breaker includes a first terminal, a second terminal and at least one movable contact. The circuit breaker further includes the system for controlled switching according to aspects described herein, particularly the system according to any of claims 11 to 14.

According to another aspect, a method for controlled switching of a circuit breaker is proposed. The method includes initiating operation of the circuit breaker at an initiation time derivable from an initiation time function. The initiation time function may depend on a first parameter.

The first parameter may be any of a total number of operations of the circuit breaker since a predetermined point in time, a total in-service time of the circuit breaker, and a cumulated interrupted current of the circuit breaker. An accuracy of a prediction regarding operating times of the circuit breaker may be improved.

The initiation time function may depend on a second parameter. The initiation time function may be a sum of a first compensation function depending on the first parameter and a second compensation function depending on the second parameter. More generally, the initiation time function may be a composite function, the sum of the first compensation function and the second compensation function being an inner function of the initiation time function.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Figure 1:
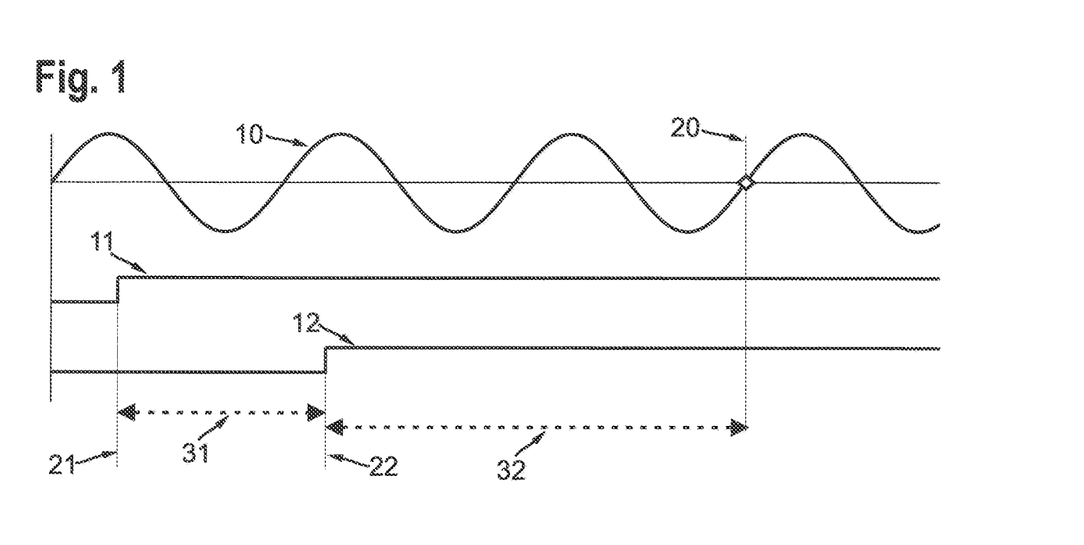
FIG. 1 is a chart illustrating the principle of controlled switching of a circuit breaker.

FIG. 1 is a chart illustrating the principle of controlled switching of a circuit breaker. A circuit breaker initiation command 11 is issued at a command instant 21, which particularly occurs at a random phase angle of a primary signal 10. The primary signal may be an electrical reference signal. The primary signal may for example be a voltage or a current. A controlled, particularly delayed, circuit breaker initiation command 12 is issued at an initiation instant 22. The time interval between the command instant 21 and the initiation instant 22 is the command delay time 31.

Controlled switching includes choosing the command delay time 31 such that the circuit breaker operates at a target switching instant 20, which is usually chosen at a phase angle that is considered advantageous to the power system, the circuit breaker, and/or the switched load. The initiation instant 22 is derived from the predicted target switching instant 20 and the estimated operating time 32 of the circuit breaker. In the context of the present disclosure, an "operating time" may be understood as a "switching time". The estimated operating time may be influenced by different parameters and typically deviates from a nominal operating time of the circuit breaker. With compensation functions, the influence of different parameters on the operating time can be taken into account to improve the controlled switching accuracy.

Figure 2A:
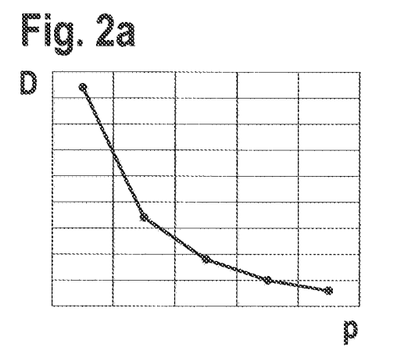
FIGS. 2a and 2b are charts of exemplary compensation functions.
Figure 2B:
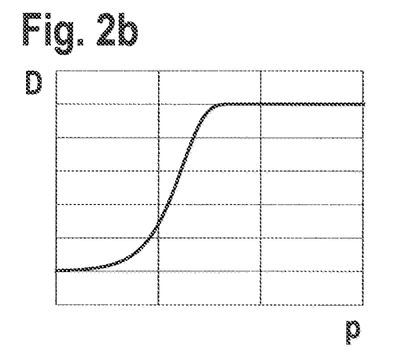

FIGS. 2a and 2b are charts of exemplary compensation functions. In both charts, a deviation D from a nominal operating time of the circuit breaker as a function of a parameter p is shown. In FIG. 2a, the compensation function is a piecewise linear function. The input parameter p may be a temperature, particularly of the circuit breaker or of the air surrounding the circuit breaker. In FIG. 2b, the compensation function is an algebraic function. The parameter p may be an idle time of the circuit breaker.

In the context of the present disclosure, an operating time of a circuit breaker may for example be understood as an opening time or a closing time of the circuit breaker. The opening time is particularly to be understood as a time interval between a time of energizing an opening circuit of a circuit breaker being in a closed state and a time when the circuit breaker reaches an open state. The closing time is particularly to be understood as a time interval between a time of energizing a closing circuit of a circuit breaker being in an open state and a time when the circuit breaker reaches a closed state. More particularly, an open or a closed state of a circuit breaker is to be understood as a state where the contacts of the circuit breaker are respectively open or closed.

Figure 3A:
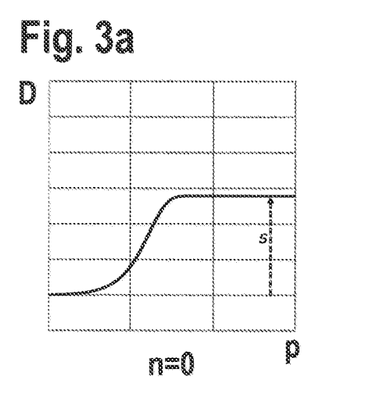
FIGS. 3a and 3b are charts illustrating how an exemplary compensation function depends on two parameters.
Figure 3B:
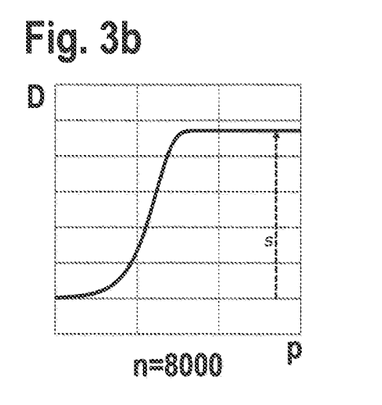

FIGS. 3a and 3b are charts illustrating how an exemplary compensation function depends on two parameters. The deviation D from a nominal operating time of the circuit breaker as a function of a parameter p is shown. The parameter p may be an idle time of the circuit breaker. FIG. 3a shows the compensation function for the case that the circuit breaker is in a new condition, i.e. has a total number of operations since commissioning, n, equaling zero. FIG. 3b shows the compensation function for n equaling 8000.

As can be seen, a saturation value s of the compensation function depends on the total number of operations n. The saturation value may depend on the total number of operations according to the equation s=a·n, with "a" being a scaling factor.

Figure 4A:
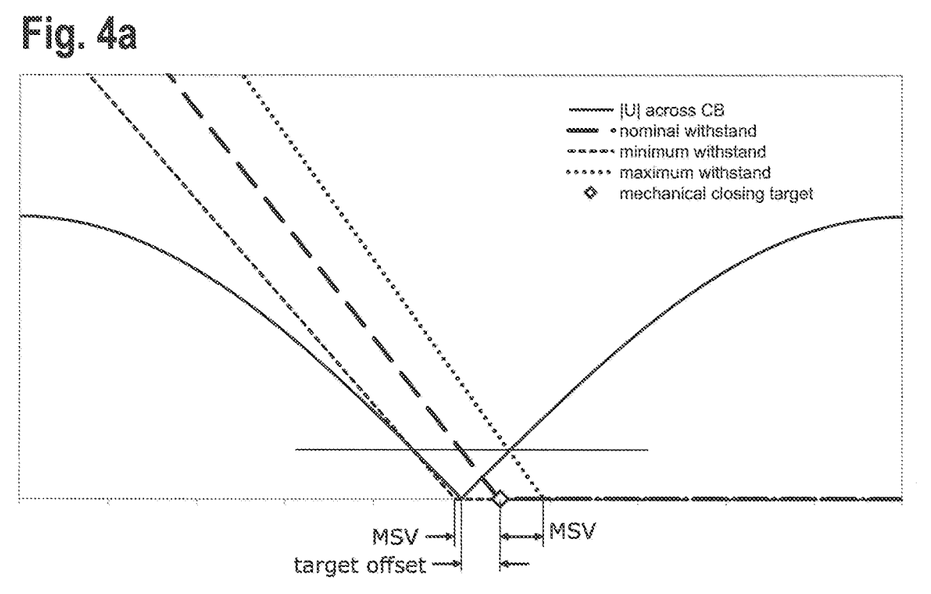
FIGS. 4a and 4b are charts illustrating an adjustment of a target switching instant due to a changed mechanical scatter value.
Figure 4B:
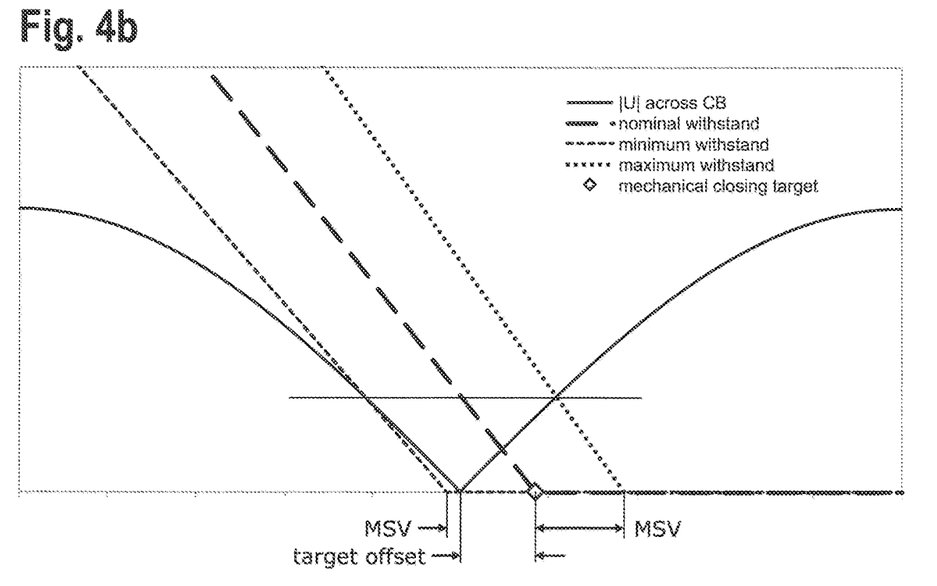

FIGS. 4a and 4b are charts illustrating an adjustment of a target switching instant due to a changed mechanical scatter value. Compared to FIG. 4a, the target switching instant is shifted in FIG. 4b so as to minimize the highest expected switching transients. The horizontal line represents the maximum pre-strike voltage during circuit breaker closing. The increased mechanical scatter value (MSV) in FIG. 4b requires an increase of the target offset in order to maintain balance between left and right intersection points of the circuit breaker's dielectric withstand and the voltage across the circuit breaker.

As a part of the present disclosure, a method for controlled switching of a circuit breaker is proposed. The method includes initiating operation of the circuit breaker at an initiation instant derivable from an initiation time function. In FIG. 1, an initiation instant 22 is indicated in an exemplary chart. FIG. 1 and the corresponding description, provided above, may be referred to for illustrative purposes. The initiation time function may depend on a first parameter.

According to an aspect, the method may further include deriving the initiation instant from the initiation time function.

Initiating operation of a circuit breaker may include energizing any of an opening circuit and a closing circuit of the circuit breaker. In particular, initiating operation of the circuit breaker may be understood as constituting energization of any of an opening circuit and a closing circuit of the circuit breaker. In the context of the present disclosure, a function being dependent on a parameter is particularly to be understood as the function being a function of the parameter.

The first parameter may be a total number of operations of the circuit breaker since a predetermined point in time. The predetermined point in time may be for example commissioning or last overhaul. The first parameter may be a total in-service time of the circuit breaker, particularly for example since commissioning or since last overhaul. The first parameter may be a cumulated interrupted current of the circuit breaker. In the context of the present disclosure, a cumulated interrupted current is particularly to be understood as an integrated value of a current flowing through the circuit breaker after contact separation, cumulated over all opening operations, for example since commissioning or since last overhaul.

Using the total number of operations, the total in-service time or the cumulated interrupted current as a parameter may improve the accuracy of the prediction regarding the operating times of the circuit breaker. For example, an increase of a mechanical closing time of the circuit breaker with increasing total in-service time may be taken into account. As another example, a reduction of a mechanical opening time of the circuit breaker with increasing cumulated interrupted current may be taken into account.

The initiation time function may depend on a second parameter. The partial derivative of the initiation time function with respect to the first parameter may be dependent on the second parameter and/or the partial derivative of the initiation time function with respect to the second parameter may be dependent on the first parameter. A particularly precise prediction of operating times of the circuit breaker may be achieved, in particular as compared to previously used approaches such as a prediction of the operating times based on a simple summation of all individual compensation values for that circuit breaker operation. Namely, the present disclosure improves switching performance and accuracy by overcoming the so far applied assumption that the influences of all parameters are independent of each other and that they are constant over the lifetime of the circuit breaker.

In the context of the present disclosure, a partial derivative of a function with respect to a chosen parameter is particularly to be understood as a derivative with respect to the chosen parameter, with all other parameters held constant. Written differently, if $$f(p_1,p_2)$$

is an initiation time function depending for example on a first parameter $p_1$ and a second parameter $p_2$, then $$\partial/\partial p_1 f = g(p_1,p_2)$$

is the corresponding partial derivative of the function with respect to the first parameter.

According to an aspect, the initiation time function may depend on a third parameter. The partial derivative of the initiation time function with respect to any of the first, the second, and the third parameter may be dependent on the respective other two parameters of the first, the second, and the third parameter. An improvement in the accuracy of the predicted operating times of the circuit breaker may be achieved.

Any of the first, the second, and the third parameter may be any of: a control voltage, a stored energy of the drive, a temperature, an idle time, a gas density or gas pressure in the interrupter, and a pressure of a fluid or gas in the circuit breaker drive.

For example, an influence of the temperature on a compensation function regarding the idle time may be considered in the initiation time function. As another example, the influence of both the control voltage and the temperature on a compensation function regarding the idle time may be considered in the initiation time function.

According to an aspect, any of the first, the second, and the third parameter may be a total number of operations of the circuit breaker since a predetermined point in time. The predetermined point in time may be for example commissioning or last overhaul. Any of the first, the second and the third parameter may be a total in-service time of the circuit breaker, particularly for example since commissioning or since last overhaul. Any of the first, the second, and the third parameter may include a cumulated interrupted current of the circuit breaker, particularly for example since commissioning or since last overhaul.

A particularly accurate prediction of the operating times of the circuit breaker may be achieved. For example, the influence of a total number of operations on a compensation function regarding an idle time may be considered in the initiation time function. As discussed above, the relationship between the total number of operations and the idle time compensation function is illustrated in FIGS. 3a and 3b.

It is conventionally assumed that the mechanical scatter (standard deviation) of the statistical fluctuations is constant over time and independent of the parameters influencing operating times. As opposed thereto, a mechanical scatter value (MSV) of the circuit breaker as described herein may be estimated in dependency on any combination of one or more parameters as described herein for the initiation time function. The initiation time function as described herein may depend on an estimated MSV, particularly so as to optimize a target switching instant. The estimated MSV may be derivable from an MSV estimation function. The MSV estimation function may depend on various parameters. The dependence of the MSV estimation function on the various parameters may be mathematically analogous to the relationships described in the context of the initiation time function. The MSV relates to a statistical standard deviation σ of the operating times of the circuit breaker. Typically, a MSV may be approximated by MSV=3·σ.

For example, the influence of any of the idle time, the stored energy of the drive, and the total number of operations of the circuit breaker on the MSV may be considered in the initiation time function. An improvement in reduction of expected switching transients may result. Particularly, a minimization of the highest expected switching transients may be achieved by shifting the mechanical target switching instant to equalize the extreme pre-strike instants (FIGS. 4a and 4b). The MSV typically increases with increasing idle time and with increasing number total number of operations of the circuit breaker. The MSV typically decreases with higher stored energy of the drive.

According to an aspect of the present disclosure, the initiation time function may be a composite function. Generally, the inner function of the composite function may be a mathematical combination of a first subfunction and a second subfunction. According to an aspect, the inner function of the composite function may be one of a weighted multiplication and a weighted division of a first subfunction and a second subfunction. The first subfunction may be dependent on the first parameter. The second subfunction may be dependent on the second parameter.

The initiation time function may be a sum of a command instant and the inner function. The command instant may be for example an instant when the user gives a command to close or open the circuit breaker. Deriving an initiation instant from the initiation time function may be understood as calculating a value of the initiation time function with respect to the command instant. The inner function may be a command delay time. A command delay time is particularly to be understood as a time interval between the command instant and an initiation instant.

Any of the first subfunction and the second subfunction may be a compensation function. The term "compensation function" is particularly to be understood with reference to the descriptions of FIGS. 2a to b. The first subfunction may be a function of the first parameter. The second subfunction may be a function of the second parameter. For example, the first parameter may be the idle time. The first subfunction may be a function of the idle time. The first subfunction may be a compensation function regarding the idle time. The second subfunction may be a function of the temperature. Thus, in particular, the influence of the temperature on the idle time compensation function is considered.

According to aspects of the present disclosure, the first subfunction may be the first parameter. An inner function of the initiation time function may for example be a weighted multiplication or division of the first parameter with the second subfunction. An associated outer function may be a compensation function. According to an aspect, the second subfunction may be the second parameter.

In embodiments, the influence of both the control voltage and the temperature on a further parameter or on a compensation function regarding the further parameter can be considered. The initiation time function then depends on three parameters. This can particularly be termed three-dimensional joint compensation.

In the context of the present disclosure, a temperature may be understood as a temperature in the surroundings of the circuit breaker, particularly a temperature within the room where the circuit breaker is located. According to an aspect, a temperature may be understood as a temperature of a part of the circuit breaker.

According to an aspect of the present disclosure, the initiation time function may be a composite function depending on a first, a second, and a third parameter. An inner function of the initiation time function may be one of a weighted multiplication and a weighted division of a first subfunction and a combination subfunction. The combination subfunction may be one of a weighted multiplication and a weighted division of a second subfunction and a third subfunction. The first subfunction may be dependent on the first parameter. The second subfunction may be dependent on the second parameter. The third subfunction may be dependent on the third parameter. An improvement in the accuracy of predicted operating times of the circuit breaker may be achieved.

According to aspects of the present disclosure, any of the first, the second and the third parameter may be any parameter influencing an operating time of a circuit breaker. A compensation function regarding any of the first, the second and the third parameter may be for example a linear, a power, an exponential, a logarithmic, or a trigonometric function. According to an aspect, any of the first, the second and the third subfunction may be formed by adding up two or more compensation functions.

Regarding compensation functions defined as piecewise linear functions, a method as described herein may include creating a mesh based on data points from each parameter. The mesh may have two or more dimensions.

According to an aspect of the present disclosure, a respective initiation instant may be derivable from the initiation time function individually for each phase of the circuit breaker. The method may include deriving or calculating a respective initiation instant for each phase of the circuit breaker, particularly individually. According to an aspect, a respective initiation instant may be derivable from separate initiation time functions for each phase of the circuit breaker.

According to an aspect of the present disclosure, a respective initiation instant may be derivable from the initiation time function individually for closing and opening of the circuit breaker. The method may include deriving or calculating a respective initiation instant for any of closing and opening of the circuit breaker. According to an aspect, a respective initiation instant may be derivable from separate initiation time functions for closing and for opening of the circuit breaker.

According to an aspect of the present disclosure, the method for controlled switching may include deriving or calculating an initiation instant from the initiation time function periodically.

According to an aspect of the present disclosure, the method for controlled switching may include deriving or calculating an initiation instant from the initiation time function upon detection of any of a closing command and an opening command of the circuit breaker.

As a part of the present disclosure, a system for controlled switching of a circuit breaker is proposed. The system is configured for performing the methods for controlled switching of a circuit breaker, as described herein. The system may include or be a point-on-wave controller (PWC), particularly a numerical PWC. The system may be any of a monitoring and a control system.

Components of the system may be configured to deliver intermediate or total compensation values to a PWC. The system may be a single electronic device or include at least two electronic devices connected via a communication link. The communication link may for example include physical interfaces and electrical connections. According to an aspect, the communication link may be a wireless data connection.

The system may include a computer. The computer may be configured, particularly programmed, to perform at least a part of the method. According to an aspect of the present disclosure, the system may be configured to retrieve at least one parameter or a compensation value based on the at least one parameter from a server, particularly from a cloud server. The at least one parameter particularly includes any of the first, the second, and the third parameter.

Any of the first, the second, and the third parameter may be a measured parameter. The measured parameter may be acquired for example by the system, particularly by the PWC, or by a separate device. The system may be configured to receive parameters acquired by the separate device directly from the separate device. According to an aspect, the separate device may be configured to store acquired parameters on a server, particularly a cloud server. The system may be configured to retrieve the acquired parameters from the server.

Figure 5:
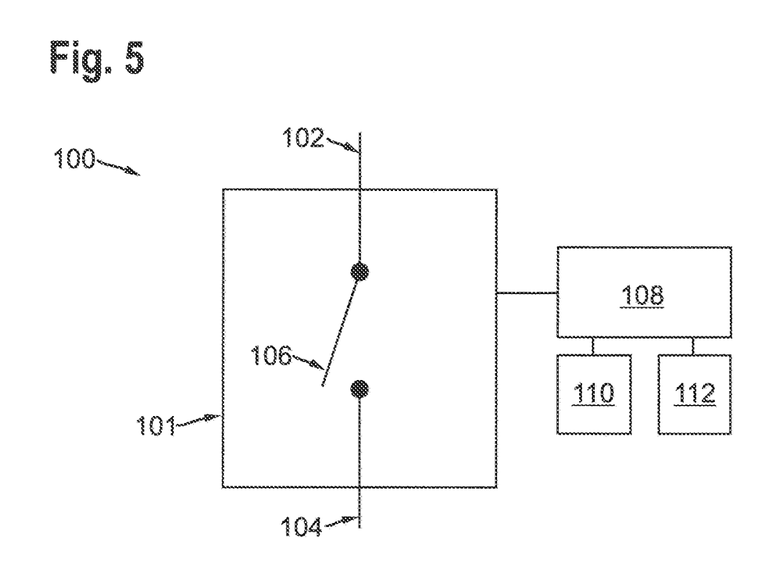
FIG. 5 is a schematic view of a circuit breaker according to an aspect of the present disclosure.

FIG. 5 is a schematic view of a circuit breaker according to an aspect of the present disclosure. The circuit breaker 100 includes a breaker unit 101 with a first terminal 102, a second terminal 104 and at least one movable contact 106. The at least one movable contact is particularly an electrical contact configured for any of interrupting and closing an electrical circuit. The circuit breaker 100 further includes a system for controlled switching of a circuit breaker according to aspects described herein. The system may include a control unit 108 connected to the breaker unit 101, particularly via electrical connections or via a data connection. The data connection may be wired or wireless.

The control unit 108 may be connected to a first sensor 110. The control unit 108 may be connected to a second sensor 112. Any of the first sensor and the second sensor may be configured for measuring at least one parameter. The at least one parameter may include at least one parameter of an initiation time function. A parameter of an initiation time function is particularly to be understood as a parameter the initiation time function depends on. In particular, the at least one parameter may include any of the first, the second and the third parameter, as described herein.

The invention claimed is:

1. A method for controlled switching of a circuit breaker, the method comprising:
    calculating a value of an initiation time function based on a first parameter value of a first parameter and a second parameter value of a second parameter, the initiation time function comprising a sum of a command instant and a command delay time, the initiation time function being dependent on the first parameter and the second parameter, and a partial derivative of the initiation time function with respect to the first parameter being dependent on the second parameter;
    deriving an initiation instant based on the calculated value;
    deriving the command instant based on the initiation instant and the initiation time function; and
    initiating a command at the command instant to initiate operation of the circuit breaker at the initiation instant.

2. The method according to claim 1, the initiation time function being further dependent on a third parameter; and
    the partial derivative of the initiation time function with respect to the first parameter being dependent on the second parameter and the third parameter.

3. The method according to claim 2, wherein at least one of the first parameter, the second parameter, and the third parameter comprises at least one of: a control voltage, a stored energy of the circuit breaker drive, a temperature, an idle time, a gas density in the interrupter, a gas pressure in the interrupter, and a pressure of a fluid in the circuit breaker drive, and a pressure of a gas in the circuit breaker drive.

4. The method according to claim 3, wherein the initiation time function comprises a composite function;
    an inner function of the initiation time function being at least one of a weighted multiplication and a weighted division of a first subfunction and a combination subfunction;
    the combination subfunction being at least one of a weighted multiplication and a weighted division of a second subfunction and a third subfunction; and
    the first subfunction being dependent on the first parameter, the second subfunction being dependent on the second parameter, and the third subfunction being dependent on the third parameter.

5. The method according to claim 2, wherein at least one of the first parameter and the second parameter comprises at least one of:

a total number of operations of the circuit breaker since a predetermined point in time;
a total in-service time of the circuit breaker since a predetermined point in time; and
a cumulated interrupted current of the circuit breaker since a predetermined point in time.

6. The method according to claim 2, wherein the initiation time function comprises a composite function;
an inner function of the initiation time function being at least one of a weighted multiplication and a weighted division of a first subfunction and a combination subfunction;
the combination subfunction being at least one of a weighted multiplication and a weighted division of a second subfunction a third subfunction; and
the first subfunction being dependent on the first parameter, the second subfunction being dependent on the second parameter, and the third subfunction being dependent on the third parameter.

7. The method according to claim 2, wherein the initiation time function depends on an estimated mechanical scatter value of the circuit breaker the estimated mechanical scatter value being dependent on at least one of the first parameter, the second parameter, and the third parameter.

8. The method according to claim 1, wherein at least one of the first parameter and the second parameter comprises at least one of: a control voltage, a stored energy of a circuit breaker drive, a temperature, an idle time, a gas density in an interrupter, a gas pressure in the interrupter, a pressure of a fluid in the circuit breaker drive, and a pressure of a gas in the circuit breaker drive.

9. The method according to claim 8, wherein the initiation time function comprises a composite function,
an inner function of the initiation time function being at least one of a weighted multiplication and a weighted division of a first subfunction and a second subfunction;
the first subfunction being dependent on the first parameter, and
the second subfunction being dependent on the second parameter.

10. The method according to claim 1, wherein the initiation time function comprises a composite function,
an inner function of the initiation time function being at least one of a weighted multiplication and a weighted division of a first subfunction and a second subfunction,
the first subfunction being dependent on the first parameter, and
the second subfunction being dependent on the second parameter.

11. The method according to claim 10, wherein at least one of the first subfunction and the second subfunction comprises at least one of the first parameter and the second parameter.

12. The method according to claim 1, wherein the initiation time function depends on an estimated mechanical scatter value of the circuit breaker, the estimated mechanical scatter value being dependent on at least one of the first parameter and the second parameter.

13. The method according to claim 1, wherein the circuit breaker comprises a plurality of phases, and
wherein deriving the initiation instant further comprises deriving a respective initiation instant from the initiation time function individually for each phase of the circuit breaker.

14. The method according to claim 1, wherein the initiating operation of a circuit breaker includes energizing at least one of an opening circuit and a closing circuit of the circuit breaker.

15. The method according to claim 1, wherein at least one of the first parameter and the second parameter comprises at least one of:
a total number of operations of the circuit breaker since a predetermined point in time;
a total in-service time of the circuit breaker since a predetermined point in time; and
a cumulated interrupted current of the circuit breaker since a predetermined point in time.

16. A system for controlled switching of a circuit breaker, the system being configured to perform a controlled switching of a circuit breaker, the controlled switching comprising:
a calculation of a value of an initiation time function based on a first parameter value of a first parameter and a second parameter value of a second parameter, the initiation time function expressible as:

$$f(p_1,p_2)$$

where f is the function, $p_1$ is the first parameter and $p_2$ is the second parameter,
the initiation time function comprising a sum of a command instant and a command delay time, the initiation time function being dependent on the first parameter and the second parameter, and a partial derivative function of the initiation time function with respect to the first parameter being dependent on the second parameter, the partial derivative function of the initiation time function expressible as $$g(p_1,p_2)=\partial/\partial p_1 f$$

where g is the partial derivative function;
a derivation of an initiation instant based on the calculated value;
a derivation of the command instant based on the initiation instant and the initiation time function; and
an initiation of a command at the command instant to initiate operation of the circuit breaker at the initiation instant.

17. The system according to claim 16, wherein the system comprising a point-on-wave controller.

18. The system according to claim 16, wherein the system comprising a computer.

19. The system according to claim 16, wherein the system further being configured to retrieve at least one parameter from a server.

20. A circuit breaker comprising:
a first terminal, a second terminal, at least one movable contact;
a system for controlled switching of a circuit breaker, the system being configured to perform a controlled switching of the circuit breaker including:
calculating a value of an initiation time function based on a first parameter value of a first parameter and a second parameter value of a second parameter, the initiation time function comprising a sum of a command instant and a command delay time, the initiation time function being dependent on the first parameter and the second parameter, and a partial derivative of the initiation time function with respect to the first parameter being dependent on the second parameter;
deriving an initiation instant based on the calculated value;

deriving the command instant based on the initiation instant and the initiation time function; and initiating a command at the command instant to initiate operation of the circuit breaker at the initiation instant.

* * * * *